US010591257B1

(12) United States Patent
Barr et al.

(10) Patent No.: US 10,591,257 B1
(45) Date of Patent: Mar. 17, 2020

(54) MULTI-LAYER WEARABLE BODY ARMOR

(71) Applicant: Honeywell Federal Manufacturing & Technologies, LLC, Kansas City, MO (US)

(72) Inventors: Christian Barr, Kansas City, MO (US); Justin Tannehill, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 16/208,676

(22) Filed: Dec. 4, 2018

(51) Int. Cl.
| | |
|---|---|
| *F41H 5/08* | (2006.01) |
| *F41H 5/04* | (2006.01) |
| *B32B 15/04* | (2006.01) |
| *B32B 15/16* | (2006.01) |
| *B32B 3/12* | (2006.01) |
| *B82Y 30/00* | (2011.01) |
| *B33Y 80/00* | (2015.01) |
| *B33Y 10/00* | (2015.01) |

(52) U.S. Cl.
CPC ............. *F41H 5/0457* (2013.01); *F41H 5/08* (2013.01); *B32B 3/12* (2013.01); *B32B 15/046* (2013.01); *B32B 15/16* (2013.01); *B32B 2260/025* (2013.01); *B32B 2264/04* (2013.01); *B32B 2307/558* (2013.01); *B32B 2571/02* (2013.01); *B33Y 10/00* (2014.12); *B33Y 80/00* (2014.12); *B82Y 30/00* (2013.01)

(58) Field of Classification Search
CPC .... F41H 5/0457; B23B 15/046; B23B 15/016
See application file for complete search history.

(56) References Cited

U.S. PATENT DOCUMENTS

| | | | | |
|---|---|---|---|---|
| 3,292,181 | A * | 12/1966 | Kennedy | B64D 10/00 2/2.5 |
| 5,435,226 | A * | 7/1995 | McQuilkin | F41H 5/0464 428/117 |
| 5,654,518 | A * | 8/1997 | Dobbs | B64D 7/00 109/49.5 |
| 5,804,757 | A | 9/1998 | Wynne | |
| 6,253,655 | B1 * | 7/2001 | Lyons | F41H 5/0428 89/36.02 |
| 6,408,733 | B1 | 6/2002 | Perciballi | |
| 6,601,497 | B2 | 8/2003 | Ghiorse et al. | |
| 7,799,710 | B1 | 9/2010 | Tan | |
| 7,866,248 | B2 | 1/2011 | Moore, III et al. | |
| 8,863,634 | B1 * | 10/2014 | Lou | F41H 5/0464 89/36.02 |
| 9,140,524 | B2 | 9/2015 | Fingerhut | |
| 2007/0268173 | A1 * | 11/2007 | Randy | F41H 3/00 342/2 |
| 2008/0307553 | A1 | 12/2008 | Jbeili et al. | |
| 2011/0259184 | A1 | 10/2011 | Adams et al. | |
| 2015/0044415 | A1 | 2/2015 | Read et al. | |
| 2018/0098589 | A1 * | 4/2018 | Diamond | A41D 31/0061 |

* cited by examiner

*Primary Examiner* — Stephen Johnson
(74) *Attorney, Agent, or Firm* — Hovey Williams LLP

(57) ABSTRACT

A multi-layer body armor plate includes a strike plate; a mesh layer positioned over the strike plate, the mesh layer having a number of open cells; and an outer skin layer positioned over the mesh layer so as to encapsulate the open cells of the mesh layer between the strike plate and the outer skin layer. The open cells of the mesh layer may entrap air or may be filled with expandable, buoyant foam.

16 Claims, 3 Drawing Sheets

MULTI-LAYER WEARABLE BODY ARMOR

GOVERNMENT INTERESTS

This invention was developed with government support under Contract No. DE-NA0000622 awarded by the United States Department of Energy. Accordingly, the U.S. Government has certain rights in the invention.

BACKGROUND

The present invention relates to body armor for protecting wearers from bullets and other ballistic projectiles.

Conventional body armor typically includes ceramic or steel plates embedded in vests or other articles of clothing. Although effective in many applications, ceramic and steel body armor plates suffer from limitations that limit their utility. For example, ceramic body armor plates are relatively thick and therefore limit wearers' mobility and ability to quickly reach firearms, radios, and other equipment. Ceramic body armor plates are also expensive and cannot be easily sized and shaped to conform to a particular wearer's physique. Ceramic body armor plates are also brittle and often crack when struck by projectiles. Such cracking makes them less effective at protecting against subsequent projectile strikes in the same area.

Steel body armor plates are often thinner than ceramic plates and typically don't crack as easily. But steel plates are heavy and therefore limit their wearers' mobility. And, as with ceramic plates, steel body armor plates are not easily sized and shaped to conform to a particular wearer's physique. Steel body armor plates also sometimes cause secondary injuries when projectiles fragment and "splash" off them and strike their wearers or others nearby. Another problem with both ceramic and steel body armor plates is they are so negatively buoyant that they can't be safely used in body armor that may be worn in or near deep bodies of water.

SUMMARY

The present invention solves the above-described problems and other problems with conventional body armor by providing a multi-layer body armor plate that is thinner and lighter than ceramic or steel body armor plates, more effective against projectile fragmentation, capable of withstanding multiple projectile hits, more easily sized and shaped to conform to a particular wearer's physique, and less negatively buoyant and therefore safer to wear in or near bodies of water.

A body armor plate constructed in accordance with an embodiment of the invention broadly comprises a strike plate; a mesh layer positioned over the strike plate; and an outer skin layer positioned over the mesh layer. The strike plate is worn closest to a wearer's torso or other body part. The mesh layer covers the outer face of the strike plate and has repeating and intersecting walls that define a number of open cells. The outer skin layer covers the mesh layer and encapsulates the open cells in the mesh layer.

The layers of the body armor plate cooperate to arrest projectile fragments and reduce injuries from fragmentation. Specifically, when a projectile strikes the body armor plate, it first penetrates, but is slowed by, the outer skin layer and the mesh layer. When it strikes the strike plate, it may fragment, but the fragments are slowed by and trapped within the mesh layer. This prevents the fragments from splashing off the body armor plate and injuring the wearer and/or others nearby.

The mesh layer, and particularly the trapped air in the mesh layer, reduce the negative buoyancy of the body armor plate so that it is safer to wear in or near bodies of water than steel or ceramic plates. The body armor plate is also lighter than ceramic or solid metal body armor plates.

In one embodiment, the strike plate is formed of a metal matrix composite material using additive manufacturing techniques. The mesh layer and outer skin layer may also be co-formed with the strike plate via the same additive manufacturing process or may be formed separately and adhered to the strike plate. Forming some or all of the layers of the body armor via additive manufacturing permits the body armor to be sized and shaped to conform to a particular wearer's physique. Moreover, additive manufacturing permits the thicknesses of the strike plate and other layers to be selected to provide protection against different types and speeds of ballistic projectiles.

An embodiment of the metal matrix composite material comprises a metal matrix and nanocellulose supplement. Use of such a metal matrix composite material allows the layers of the body armor plate to be relatively thin and lightweight while still providing sufficient protection against projectiles. This material also resists cracking and thus protects against multiple ballistic strikes in the same area.

Some embodiments of the body armor plate may also include an expandable, buoyant foam that at least partially fills the open cells of the mesh layer. In other embodiments, the open cells simply trap air inside the body armor plate.

Embodiments of the invention may also include a vest or other wearable article of clothing in which one or more of the above-described body armor plates may be supported over a wearer's torso or other body part. The body armor plates may also be applied to or embedded within other objects such as vehicle door panels, walls, ceilings, etc.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
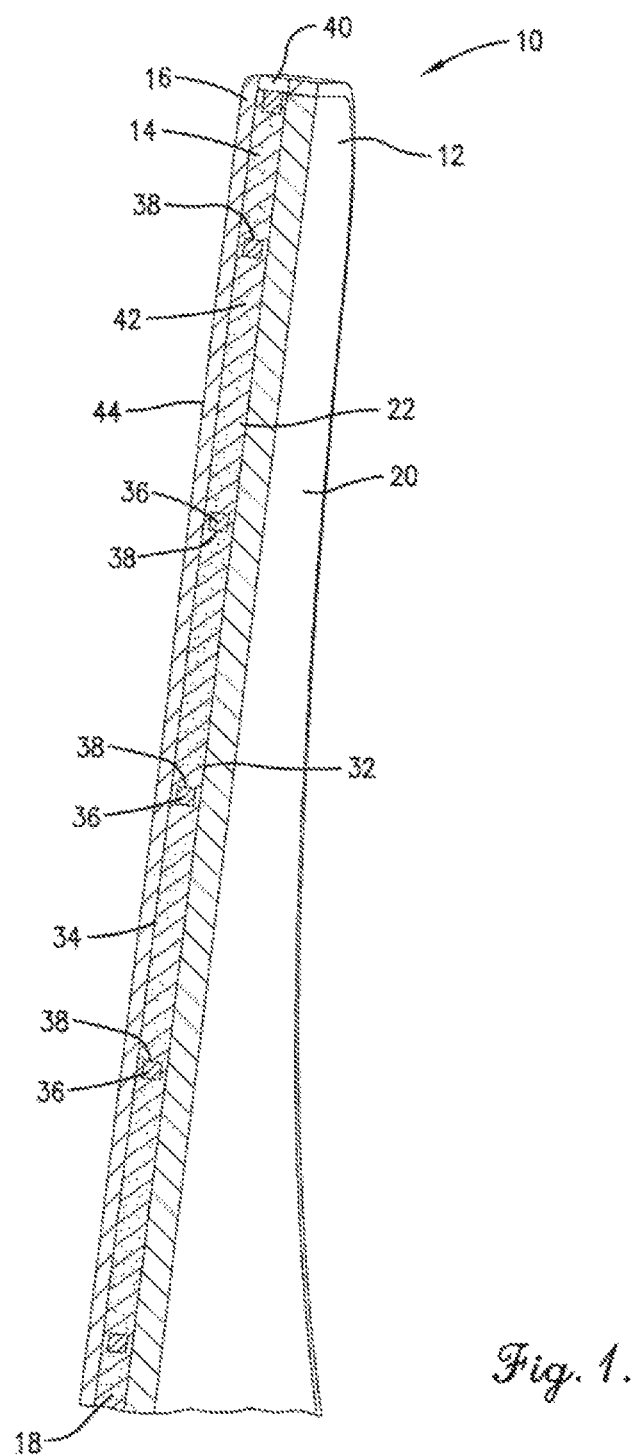
FIG. 1 is a partial vertical cross-sectional view of a body armor plate constructed in accordance with an embodiment of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

Embodiments of the present invention provide a body armor plate formed of multiple layers that are cooperatively configured so as to be thinner and lighter than ceramic or steel body armor plates, more effective against projectile fragmentation, capable of withstanding multiple projectile hits, and less negatively buoyant and therefore safer to wear in or near bodies of water. Some or all of the layers of the body armor plate may be formed via additive manufacturing techniques so that the body armor plate may be more easily sized and shaped to conform to a particular wearer's physique. The plates are preferably formed of a metal matrix composite material that is stronger and lighter than many conventional materials.

Figure 2:
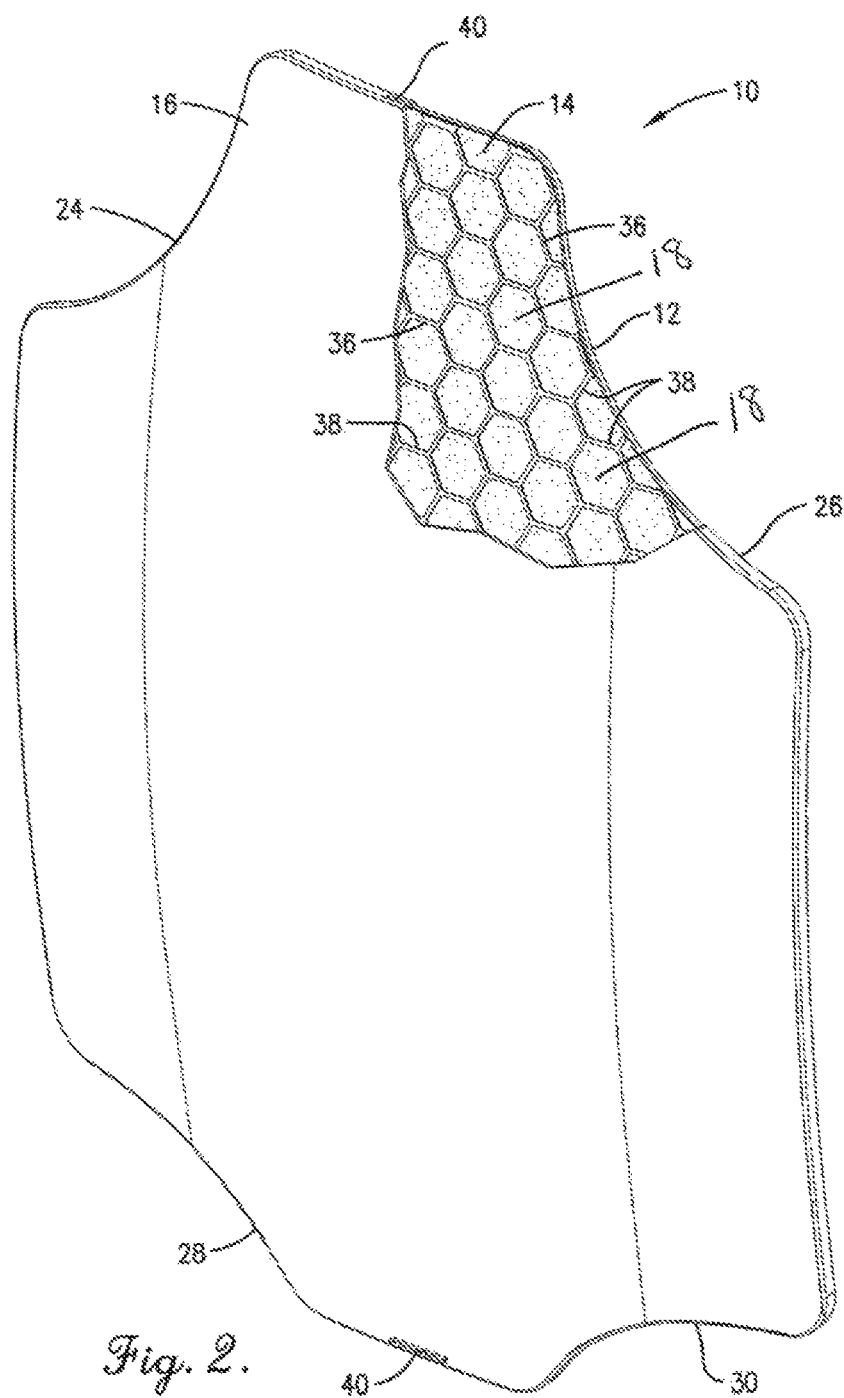
FIG. 2 is a front elevational view of the body armor plate of FIG. 1 with portions hidden to reveal interior features.

Specific embodiments of the body armor plate will now be described with reference to the attached drawing figures. Turning now to FIGS. 1 & 2, a body armor plate 10 constructed in accordance with embodiments of the invention is illustrated and broadly comprises a strike plate 12; a mesh layer 14 positioned over the strike plate 12; and an outer skin layer 16 positioned over the mesh layer 14. Each of these layers are described in more detail below.

Some embodiments of the body armor plate may also comprise expandable, buoyant foam 18 that at least partially fills voids in the mesh layer. In other embodiments, the voids in the mesh layer are filled with entrapped air instead.

The strike plate 12 has an inner face 20 for at least partially covering the wearer's chest, back, or other body portion and an outer strike face 22 that may be impacted by a ballistic projectile. As shown in FIG. 2, concave reliefs 24, 26 may be formed in the upper corners of the strike plate 12 for accommodating the wearer's arms. Similar concave reliefs 28, 30 may be formed in the lower corners of the strike plate 12 for accommodating the wearer's hips and thighs. In one embodiment, the strike plate has a multi-curved profile for conforming to the wearer's torso. Specifically, the strike plate may be curved from top-to bottom and from side-to-side so as to closely conform to a wearer's chest and/or abdomen. The strike plate 12 may be formed in any thickness, and in one embodiment, is between 0.125 and 0.5 inches thick.

The strike plate 12 is preferably formed of a metal matrix composite material comprising a metal matrix and a nanocellulose supplement. The metal matrix forms a base structure and may be a monolithic material such that the metal matrix is continuous throughout the composite material. The metal matrix may be formed of aluminum, magnesium, titanium, or other structural metals, or cobalt, cobalt-nickel alloys, steel and ferrous alloys, or other metals for high-temperature applications. The metal matrix may be formed from a metal base material such as a powder or feedstock.

The nanocellulose supplement improves properties of the composite material and may be microscopic nanocellulose particles dispersed throughout the metal matrix. The nanocellulose supplement may be substantially mixed with particles of the metal matrix such that the composite material is a homogenous composite. The nanocellulose supplement may be any form of nano-structured cellulose. This may be either cellulose nanofibers (CNF), also called microfibrillated cellulose (MFC), nanocrystalline cellulose (NCC), also called crystalline nanocellulose, and bacterial nanocellulose, which refers to nano-structured cellulose produced by bacteria, among others, not to limit other potential forms or sources of nanocellulose. The nanocellulose supplement may increase the strength, change porosity of the metal matrix, or alter other properties of the composite material 10. The nanocellulose supplement may be formed from a nanocellulose supplement material.

Use of such a metal matrix composite material allows the strike plate 12 (and other layers of the body armor plate 10 if formed from the same materials) to be relatively thin and lightweight while still providing sufficient protection against projectiles. This material also resists cracking and thus provides all or much of its initial protection even when subjected to multiple ballistic strikes in the same area. The above-described metal matrix composite material may be used to form the strike plate and/or other layers of the body armor plate 10 via an additive manufacturing process described below.

The mesh layer 14 is positioned over the strike plate 12 and has an inner side 32 positioned on the outer strike face of the strike plate 12 and an opposite outer side 34. The mesh layer may include the same concave reliefs and multi-curved profile as the strike plate 12 so as to match the overall shape and size of the strike plate. The mesh layer may have any thickness, and in one embodiment, is approximately the same thickness as the strike plate 12, between 0.125 and 0.5 inches thick.

As best shown in FIG. 2, the mesh layer 14 also has a number of intersecting walls 36 that define a plurality of open cells 38 between its inner and outer sides 32, 34. The walls 36 and cells 38 may be in a honeycomb pattern, grid pattern, or any other repeating or non-repeating pattern. Any number of cells 38 of any size may be formed in the mesh layer. In one embodiment, the mesh layer has a cell density of approximately 12 cells per square inch, and each cell has a volume of approximately 0.015 cubic inches.

As illustrated in FIGS. 1 & 2, the mesh layer may also have access holes 40 along one or more of its edges through which excess powder may drain after an additive manufacturing process has been completed. In embodiments which include expandable foam, these access holes may also be used to inject the expandable foam as described in more detail below.

The mesh layer may 14 be co-formed with the strike plate 12 via the same additive manufacturing process or may be formed separately and adhered to the strike plate with adhesives or fasteners. Similarly, the mesh layer may be formed of the same metal matrix composite material as the strike plate or a different material.

The outer skin layer 16 is positioned over the mesh layer 14 and has an inner face 42 and an opposite outer face 44. The outer skin layer 16 may wrap around the edges of the mesh layer 14 so that its inner face 42 encapsulates the open cells 38 of the mesh layer 44 between it and the strike plate 12. The outer skin layer 16 may have any thickness, and in one embodiment, is between 0.025 and 0.0625 inches thick.

The outer skin layer 16 may be co-formed with the strike plate 12 via the same additive manufacturing process or may be formed separately and adhered to the strike plate. Likewise, the outer skin layer 16 may be formed of the same metal matrix composite material as the strike plate or a different material.

The open cells 38 in the mesh layer 14 entrap air. In other embodiments, foam 18 at least partially fills the open cells 38 in the mesh layer 14. The entrapped air or foam protect against fragmentation. The foam 18 may be any expandable material. In one embodiment, the foam is injected into the open cells 38 of the mesh layer 14 via the access holes 40.

In other embodiments, the foam 18 is added to the mesh layer 14 as the mesh layer is fabricated.

Embodiments of the invention may also include a vest or other wearable article of clothing for supporting one or more of the above-described body armor plates 10 over a wearer's torso or other body part. The body armor plates 10 may also be applied to or embedded within objects such as vehicle door panels, walls, ceilings, etc.

The above-described body armor plate 10 provides numerous advantages. For example, the layers 12, 14, 16 cooperate to arrest projectile fragments and reduce related injuries. When a projectile strikes the body armor plate 10, it penetrates, but is slowed by, the outer skin layer 16 and the mesh layer 14. When it strikes the strike plate 12, it may fragment, but the fragments are slowed by and trapped within the mesh layer 14. This protects the wearer and those nearby from fragmentation. The mesh layer 14, and the trapped air or foam in the mesh layer also improve the negative buoyancy of the body armor plate 10.

Figure 3:
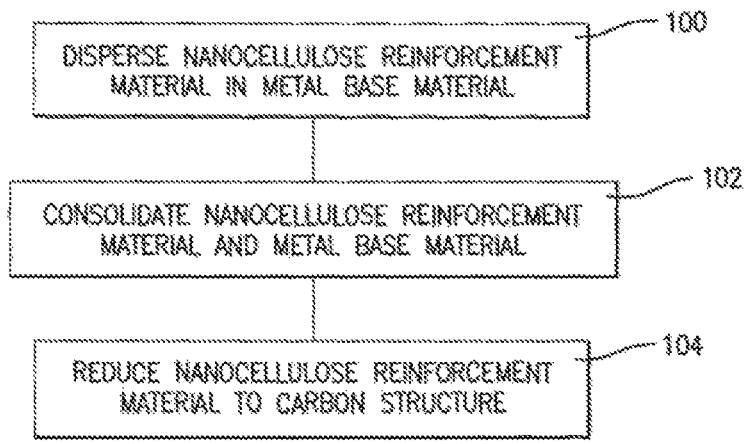
FIG. 3 is a flow diagram depicting steps in a method of making a composite material that may be used to fabricate the body armor plate.
Figure 4:
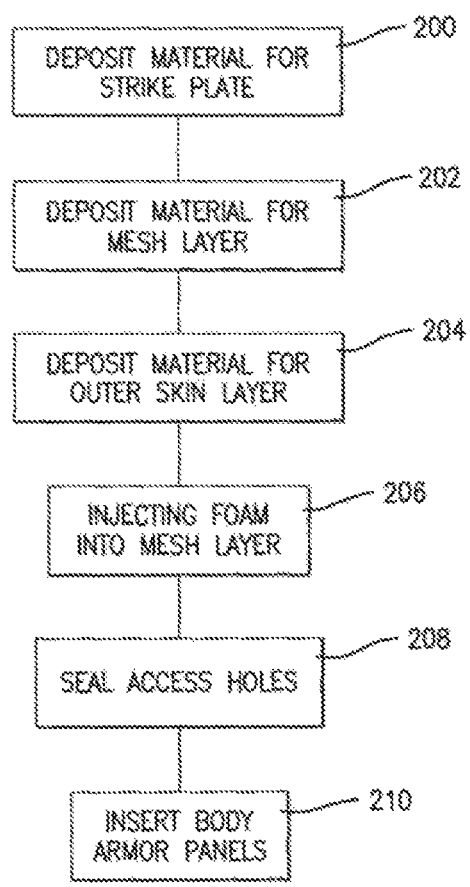
FIG. 4 is a flow diagram depicting steps in a method of fabricating the body armor plate via an additive manufacturing process.

Methods of forming the metal matrix material used in the body armor plate 10 and fabricating the body armor plate itself are depicted in the flow charts of FIGS. 3 & 4. These flow charts show some of the aspects of preferred implementations of the present invention. In some alternative implementations, the steps or functions noted in the various blocks may occur out of the order depicted in the figures. For example, two blocks shown in succession may in fact be performed substantially concurrently, or the steps may be executed in the reverse order or a different order.

Exemplary methods for forming the metal matrix materials will now be described with reference to FIG. 3. To form the composite material via consolidation such as additive manufacturing, casting, and sintering, a metal base material (e.g., microscopic metal matrix particles) such as metal powder and a nanocellulose supplement material (e.g., microscopic nanocellulose particles) may be blended together such that the nanocellulose supplement material is dispersed in the metal base material as shown in block 100 of FIG. 3. This may be performed via pre-mixing, simultaneous material dispensing, or any other suitable dispersion.

The metal base material and the nanocellulose supplement material may then be consolidated such as via high temperature consolidation (e.g., compaction, degassing, and/or thermo-mechanical treatment) such that the metal base material fuses or otherwise bonds together with the nanocellulose supplement material being dispersed throughout the metal matrix, as shown in block 102. The nanocellulose supplement material may be heated to a predetermined temperature and/or pressure for a predetermined amount of time for effecting proper fusing of the metal base material and dispersion of the nanocellulose supplement material. The consolidation may also be performed in a vacuum or under pressure.

The nanocellulose supplement material may be subjected to partial burnout or complete burnout such that at least some of the organic structure of the nanocellulose supplement material 18 is reduced to carbon, as shown in block 104. This results in undamaged carbon reinforcing the metal matrix.

The composite material may also be formed via electroplating, electroforming, vapor deposition, and in-situ fabrication. For example, the metal matrix and the nanocellulose supplement may be blended via solid state, semi-solid state, or liquid state processing. The particular nanocellulose supplement material may be selected according to the desired improved property of the composite material. The relative percentage of nanocellulose supplement to metal matrix may also be chosen according to the desired properties of the composite material. For example, more nanocellulose supplement may be used if additional strength is desired.

The above-described composite material and method of forming the same provide several advantages over conventional composite materials. For example, the nanocellulose supplement material 18 can be dispersed in the metal base material without damage to the nanocellulose supplement material, unlike graphene and carbon nanotubes which become damaged during formation. The nanocellulose supplement material is also more easily dispersed in the metal base material than graphene and carbon nanotubes. The composite material 10 can be formed via additive manufacturing, casting, and sintering, allowing for the composite material to be used in large and small structural, electrical, biochemical, and biomechanical applications. Nanocellulose is also a renewable and readily available resource.

Exemplary methods of forming body armor plates such as the body armor plate 10 described above will now be described with reference to FIG. 4. In one embodiment, the body armor plates are fabricated with powder bed fusion additive manufacturing techniques comprising the following steps. First, the strike plate 12 is formed by depositing a metal matrix composite material onto a form or other structure as shown in block 200. The strike plate 12 may be formed so as to have a multi-curved profile, an inner face 20, an outer strike face 22, upper corner concave reliefs 24, 26, and lower corner concave reliefs 28, 30 as shown in FIG. 2. This step may comprise or be proceeded by the step of designing the shape and multi-curved profile of the strike plate 12 so it conforms to a particular wearer's torso or other body part.

Next, the mesh layer 14 is formed by depositing additional metal matrix composite material on the strike plate 12 as shown in block 202. Alternatively, the mesh layer 14 may be formed separately from the strike plate 12 and subsequently glued or otherwise attached to the strike plate. The mesh layer 14 may be formed so as to have an inner side 32 positioned on the outer strike face 22 of the strike plate 12 and an opposite outer side 34. The mesh layer also includes a number of intersecting walls 36 that define a number of open cells 38. The access holes 40 in the mesh layer 14 may also be formed in this step.

Next, the outer skin layer 16 is formed by depositing additional metal matrix composite material on the mesh layer 14 as shown in block 204. Alternatively, the outer skin layer 16 may be formed separately and glued on otherwise attached over the mesh layer 14. The outer skin layer 16 is preferably formed so as to extend over the edges of the mesh layer 14 to encapsulate the mesh layer 14 between the strike plate 12 and the outer skin layer 16.

During the formation of the layers 12, 14, 16, any unfused metal matrix powder may drain from the body armor plate via the access holes 40.

In embodiments of the body armor plate that include foam in the mesh layer 14 rather than entrapped air, expandable, buoyant, closed cell foam 18 is injected in the open cells 38 of the mesh layer 14 as depicted in block 206. In some embodiments, other materials such as epoxies or polymers may be used instead of foam, and as mentioned above, in some embodiments, only air or other gas is trapped in the open cells 38. The foam or other materials may be injected into the open cells via the access holes 40. The access holes are then sealed with any suitable materials as depicted in block 208.

Finally, one or more of the fabricated body armor plates 10 is inserted in a vest or other wearable item as depicted in block 210. The plates 10 may also be inserted in or attached to walls, door panels, and other structures or objects.

Forming some or all of the layers of the body armor plate 10 via additive manufacturing as described above permits the body armor plates to be sized and shaped to conform to a particular wearer's physique. Moreover, additive manufacturing permits the thicknesses of the strike plate 12 and other layers to be selected to provide protection against different types and speeds of ballistic projectiles. Different portions of each layer can also be formed in different thickness to provide extra protection or extra mobility as needed. For example, portions of the layers 12, 14, 16 configured to cover a wearer's heart maybe relatively thicker for added protection whereas portions of the layers configured to cover a wearer's hips may be relatively thinner to provide better mobility.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A multi-layer armor plate comprising:
a strike plate formed via additive manufacturing of metal matrix composite materials comprising a metal matrix and a nanocellulose supplement;
a mesh layer positioned over the strike plate, the mesh layer having a number of open cells; and
an outer skin layer positioned over the mesh layer so as to encapsulate the open cells of the mesh layer between the strike plate and the outer skin layer.

2. The armor plate set forth in claim 1, wherein the strike plate has a multi-curved profile for conforming to a wearer's torso, an inner face for at least partially covering the wearer's chest, an outer strike face, upper corner concave reliefs for accommodating the wearer's arms, and lower corner concave reliefs for accommodating the wearer's hips and thighs.

3. The armor plate set forth in claim 2, wherein the mesh layer is formed of metal and has an inner side positioned on the outer strike face of the strike plate and an outer side, with the open cells formed between the inner side and the outer side.

4. The armor plate set forth in claim 3, wherein the open cells of the mesh layer entrap air.

5. The armor plate set forth in claim 1, wherein the mesh layer has an outer side and the outer skin layer is formed of metal and has an inner face and an outer face, the inner face positioned over the outer side of the mesh layer so as to encapsulate the open cells of the mesh layer between the strike plate and the outer skin layer.

6. The armor plate set forth in claim 1, further comprising expandable, buoyant foam that at least partially fills the open cells of the mesh layer.

7. A multi-layer, wearable body armor plate comprising:
a strike plate formed via additive manufacturing of metal matrix composite materials comprising a metal matrix and a nanocellulose supplement and having a multi-curved profile for conforming to the wearer's torso, an inner face for at least partially covering the wearer's chest, an outer strike face, upper corner concave reliefs for accommodating the wearer's arms, and lower corner concave reliefs for accommodating the wearer's hips and thighs;
a mesh layer having an inner side positioned on the outer strike face of the strike plate, an outer side, a number of open cells formed between the inner side and outer side, and edges between the inner side and the outer side; and
a metallic outer skin layer positioned over the outer side and the edges of the mesh layer so as to encapsulate the open cells of the mesh layer between the strike plate and the outer skin layer.

8. The body armor plate set forth in claim 7, wherein the mesh layer is formed of metal.

9. The body armor plate set forth in claim 8, wherein the open cells of the mesh layer entrap air.

10. The body armor plate set forth in claim 7, further comprising expandable, buoyant foam that at least partially fills the open cells of the mesh layer.

11. A method of forming a multi-layer, wearable body armor plate comprising:
- depositing a metal matrix composite material via additive manufacturing to form a strike plate having a multi-curved profile, an inner face, an outer strike face, upper corner concave reliefs, and lower corner concave reliefs;
- depositing additional metal matrix composite material via additive manufacturing to form a mesh layer over the strike plate, the mesh layer having an inner side positioned on the outer strike face of the strike plate, an outer side, a number of open cells formed between the inner side and the outer side, and edges between the inner side and the outer side; and
- depositing additional metal matrix composite material via additive manufacturing to form a metallic outer skin layer over the outer side and the edges of the mesh layer so as to encapsulate the open cells of the mesh layer between the strike plate and the outer skin layer.

12. The method as set forth in claim 11, wherein the metal matrix composite materials comprise a metal matrix and a nanocellulose supplement.

13. The method as set forth in claim 11, further comprising forming access holes in the mesh layer.

14. The method as set forth in claim 13, further comprising injecting expandable, buoyant foam in the open cells of the mesh layer.

15. The method as set forth in claim 13, further comprising sealing the access holes.

16. The method as set forth in claim 11, further comprising designing the multi-curved profile of the strike plate so the strike plate conforms to a particular wearer's torso.

* * * * *